United States Patent

[11] 3,609,126

| [72] | Inventors | Hiroshi Asao Yokohama; Fujio Yoshida, Yokohama; Kenichi Tomihara, Tokyo; Mikio Akimoto, Yokohama; George Kubota, Tokyo, all of Japan |
|---|---|---|
| [21] | Appl. No. | 710,734 |
| [22] | Filed | Mar. 6, 1968 |
| [45] | Patented | Sept. 28, 1971 |
| [73] | Assignee | Toho Kagaku Kogyo Kabushiki Kaisha Tokyo, Japan |
| [32] | Priority | Mar. 8, 1967 |
| [33] | | Japan |
| [31] | | 42/14208 |

[54] PROCESS FOR PRODUCING WATER-SOLUBLE THERMOSETTING POLYMER
7 Claims, No Drawings

[52] U.S. Cl................................................. 260/78, 162/164, 260/18, 260/29.2
[51] Int. Cl............................................................. C08g 20/38
[50] Field of Search.......................................... 260/78 SC, 18 N

[56] References Cited
UNITED STATES PATENTS

| 2,835,653 | 5/1958 | Haas et al. ..................... | 260/72 |
| 2,926,154 | 2/1960 | Keim ............................. | 260/29.2 |
| 2,998,295 | 8/1961 | Goldann et al. .............. | 8/115.5 |
| 3,329,657 | 7/1967 | Strazdins et al.............. | 260/78 |

Primary Examiner—Harold D. Anderson
Attorney—Holcombe, Wetherill & Brisebois

ABSTRACT: A process for producing a water-soluble thermosetting polymer by reacting a dibasic carboxylic acid with a polyalkylene polyamine, then an alkylene oxide and then an epihalohydrin in successive steps.

PROCESS FOR PRODUCING WATER-SOLUBLE THERMOSETTING POLYMER

The present invention relates to process for producing a water-soluble thermosetting polymer by reacting a dibasic carboxylic acid with, a polyalkylene-polyamine, then an alkylene oxide, and then an epihalohydrin.

In this process a polyamide polyamine is produced by reacting a dibasic carboxylic acid and a polyalkylene-polyamine. A hydroxy group is introduced by reacting said polyamide polyamine and alkylene oxide. Finally, an epoxy group is introduced by reacting this hydroxyalkyl polyamide polyamine with an epihalohydrin in aqueous solution, thereby producing a water soluble thermosetting polymer.

As disclosed in U.S. Pat. No. 2,926,154 and Japanese Pat. No. 448,,377, it is known that a water-soluble cationic thermosetting resin may be manufactured by heating together at reaction temperature a saturated dibasic carboxylic acid and polyalkylene-polyamine, so as to produce a polyamide polyamine, and then reacting said polyamide polyamine with epichlorohydrin; or to obtain a reaction product by reacting polyalkylene-polyamine with another epihalohydrin.

However, it is difficult to obtain these products without gelation, and they age rapidly so that they are unsuitable for long storage.

The present inventors, after various investigations seeking to overcome the above-mentioned drawbacks, have successfully accomplished their objective, on the basis of their discovery that the water-soluble thermosetting polymer obtained by their process can be efficiently employed as a coagulant for aqueous solutions, such as inorganic or organic suspensions, colored water, etc., a treating agent for various textiles, an assistant for papermaking, a dry or wet strengthening agent for paper in the amount of 0.1–5 percent of pulp, a coagular precipitator in the amount of 50–1000 p.p.m. of suspension, a decolorant in the amount of 100–1,000 p.p.m. of suspension, an agent for improving the yield of pulp and filler, a recovering agent for white water, an agent for improving the drainage of paper, a polymerizer for cross-linking and as an anti-hydration agent and shrink resistant treatment for wool.

The present invention is mainly characterized by the reaction of an alkylene oxide with polyamide polyamine, (i.e., the primary or secondary amino-group of the reaction product between dibasic carboxylic acid and polyalkylene-polyamine). By varying the kind and quantity of alkylene oxide, it is possible to change the properties of the resulting polymer to a certain extent.

The introduction of ethylene oxide will also greatly help to impart water-absorbing properties to the water soluble thermosetting polymer.

Generally speaking, when a polyamide polyamine, or a polyalkylene-polyamine is reacted with epichlorohydrin, a reaction takes place that is hard to control so as to produce the polymer sought.

In this case, the reaction of an alkylene oxide with the polyamide polyamine, followed by the reaction of the product by epichlorohydrin, retards the reaction velocity and makes it easy to obtain the desired product. Moreover, the product obtained by the reaction of alkylene oxide is less subject to increased viscosity due to aging and remains stable for longer periods than the product obtained without the reaction of alkylene oxide.

In the present invention the dibasic carboxylic acid employed has the following general formula:

where R represents a saturated aliphatic hydrocarbon having 1–34 carbon atoms.

The dibasic carboxylic acid to be employed can be a saturated aliphatic hydrocarbon such as, succinic acid, glutaric acid, adipic acid, pimelic acid, azelaic acid, sebacic acid, or a mixture containing a plurality of these acids.

The polyalkylene-polyamine to be employed has the following general formula:

wherein $n$ is 2; $m$ is 2–4.

This polyalkylene-polyamine may be, for example, diethylene triamine, triethylenetetramine, tetraethylenepentamine, or a mixture containing a plurality thereof.

Epihalohydrin, as used herein, means epichlorohydrin or epibromohydrin.

The alkylene oxide to be employed is ethylene oxide, or propylene oxide.

The above-mentioned dibasic carboxylic acid and polyalkylene-polyamine are reacted at a reaction temperature of 100°–250° C. under a nitrogen atmosphere or at 70°–200° C. under reduced pressure; the reaction mol ratio is 1 mol of dibasic carboxylic acid to 1.0–1.8 mols of polyalkylene-polyamine.

The polyamide polyamine and alkylene oxide are reacted under atmospheric pressure or under greater pressure, with or without a catalyst, with a stream of nitrogen flowing at a reaction temperature of 80–200° C. An appropriate catalyst is sodium acetate, sodium hydroxide or potassium hydroxide. The reaction mol ratio is one mol of dibasic carboxylic acid to 0.1–4.0 mols alkylene oxide, and preferably to 0.5–4.0 mols alkylene oxide. If less than 0.5 mol of alkylene oxide is used, a water-soluble thermosetting polymer may be obtained, but the product will not be suitable for prolonged storage, because the reaction is accompanied by gelation or gelation develops after the product is obtained. This tendency toward gelation is particularly conspicuous when less than 0.1 mol is employed. Thus, reactions utilizing less than 0.1 mol of alkylene oxide per mol of carboxylic acid are considered to be outside the scope of this invention. By contrast, the use of more than 4.0 mols of alkylene oxide is undesirable, even though no gelation problem arises because of poor reactivity of alkylene oxide to polyamide polyamine.

Hydroxyalkylpolyamidepolyamine and an epihalohydrin are reacted, using an aqueous solution with 5–70 percent solids at a temperature of 30°–100° C., preferably at 50–100° C., in a nitrogen atmosphere, the number of mols of epihalohydrin per active hydrogen in the amino and hydroxy groups of the hydroxyalkylpolyamidepolyamine being preferably 0.1–2.5 and preferably 0.1–2.0. After the reaction is over, the product is adjusted to a pH value less than 5.0, using a mineral acid such as hydrochloric acid, phosphoric acid or sulfuric acid; or an organic acid such as formic acid and acetic acid.

The reaction product thus obtained will have different degrees of gelation depending on the pH. Gelation is most rapid around pH 9, and the lower the pH, the more stable the product but the slower the gelation.

Next, the present invention will be illustrated by several examples.

EXAMPLE 1

160 g. of triethylene tetramine and 146 g. adipic acid were charged into a flask equipped with a mixer, a thermometer and a water-trap with a reflux condenser. The mixture was heated to 180°–190° C. while nitrogen gas was being injected and permitted to react for 4 hours. The reaction was halted when an acid number of 0.8 was attained. To drive out the water in the flask, the product was post-treated for 1 hour at about 170° C. with a somewhat increased injection of nitrogen gas. This condensation yielded 40 g. of distillate.

1.3 g. of sodium acetate was added to the polyamide polyamine and, with the reaction temperature held at 150°–180° C., 44 g. of ethylene oxide (equivalent to 1 mol per mol of adipic acid) was introduced, the reaction lasting 4.5 hours. After the reaction, the product was cooled to about 100° C., and 310 g. of water was added to dissolve the product at 80°–90 C.

Then, the 310 g. of 50% aqueous solution of hydroxyethyl Polyamide polyamine obtained in this manner was charged into a flask equipped with a mixer, a thermometer and a condenser, 622 g. dissolve of water was added to dissolve it and 69 g. of epichlorohydrin was added to react for 3 hours with the temperature kept at 70°–90° C. The reaction was stopped when viscosity of 10 c.p.s. (25° C.) was attained. The product was then cooled to 40° C. and, using 10% aqueous solution of hydrochloric acid, its pH value was adjusted to 4.0. Finally, after adding sufficient water to form a product comprising 20% solids, the yield was 1108 g. of the reaction product.

The properties of the product were as follows:

| Appearance | Yellowish brown or reddish brown clear liquid |
|---|---|
| Solids | 20% |
| pH | 4.0 |
| Viscosity | 12.0 c.p.s. (25° C ) |
| (as measured by Brock field viscometer) | |

EXAMPLE 2

455 g. of diethylenetriamine and 535 g. of adipic acid were charged into a flask similar to the one used in example 1, and reacted for 3 hours at 170°–185° C. The reaction was terminated when the acid number reached 1.0; and the water removed in the same way as in example 1, yielding 117 g. of distillate.

Then 660 g. of the resulting polyamide polyamine was charged into an autoclave equipped with a mixer, a thermometer, and a pipe for introducing ethylene oxide. 2.0 g. of sodium acetate was added as catalyst and 66 g. of ethylene oxide (equivalent to 0.54 mol per mol of adipic acid) was then introduced at 120°–140° C., under a gauge pressure of 0 –5.0 kg/cm². The reaction lasted 1.5 hours, after which 726 g. of water was added and 50% aqueous solution of hydroxy ethyl polyamide was obtained. Then, 484 g. of an aqueous solution of this 50% hydroxyethyl polyamide polyamine was charged into a flask similar to the one used in example 1; 742 g. of water was added; 64 g. of epichlorohydrin was added to cause reaction for 3 hours at 60°–70° C.; the reaction was terminated when the viscosity reached 20 c.p.s. (25° C.). The product was cooled, adjusted to pH 3.8 using 10% aqueous solution of hydrochloric acid, and sufficient water added to make a mixture containing 20% solids. The final yield was 1,510 g. of reaction product.

The properties of this product were as follows:

| Appearance | Yellowish brown or reddish clear liquid |
|---|---|
| Solids | 20% |
| pH | 3.8 |
| Viscosity | 25 c.p.s. (25° C.) |

EXAMPLE 3

Under a nitrogen atmosphere 1,135 g. of diethylenetriamine and 1,460 g. of adipic acid were heated to 150°–180° C. for condensation. At an acid number of 2.0, the reaction was terminated, yielding polyamidepolyamine. 219 g. of the resulting polyamidepolyamine was mixed with potassium hydroxide and sodium acetate. Then, with nitrogen gas still being injected, the reaction with ethylene oxide was carried out at 160 –180° C., gauge pressure 0–6Kg/cm² The resulting hydroxyethylpolyamidepolyamine was diluted with tap water to produce a 50% aqueous solution. In this reaction, the quantities and reaction times of potassium hydroxide, sodium acetate and ethylene oxide were as indicated in Table 1

TABLE 1

| Test No. | 3-1 | 3-2 | 3-3 | 3-4 | 3-5 |
|---|---|---|---|---|---|
| Conditions: | | | | | |
| Ethylene oxide (g.) | 26 | 44 | 88 | 132 | 176 |
| Potassium hydroxide (g.) | 0.7 | 0.8 | 0.9 | 1.0 | 2.0 |
| Sodium acetate (g.) | 0.7 | 0.8 | 0.9 | 1.0 | 2.0 |
| Reaction time (hr.) | 2.0 | 5.5 | 9.0 | 12.5 | 24.0 |

Next, the resulting 50% aqueous solution of hydroxyethylpolyamidepolyamine was mixed with epichlorohydrin and tap water to cause reaction at 60°–70° C. When the viscosity reached 80 c.p.s. (25° C.) more epichlorohydrin was added. When again the viscosity reached 80 c.p.s. (25° C.), the reac-

TABLE 2

| Test No. | 3-1 | 3-2 | 3-3 | 3-4 | 3-5 |
|---|---|---|---|---|---|
| Conditions: | | | | | |
| 50% aqueous solution of hydroxyethyl-polyamide-polyamine (g.) | 128 | 130 | 138 | 144 | 148 |
| Epichlorohydrin (g.) | 25 | 23 | 21 | 19 | 12 |
| Additional epichlorohydrin (g.) | 12 | 12 | 10 | 9 | 14 |
| Tap water (g.) | 136 | 135 | 131 | 128 | 26 |
| Reaction time (hr.) | 2.6 | 3.3 | 5.5 | 15.0 | 11.5 |

TABLE 3

| Example No. | 4-1 | 4-2 | 4-3 | 4-4 | 4-5 |
|---|---|---|---|---|---|
| Properties: | | | | | |
| pH | 3.5 | 3.3 | 3.6 | 3.8 | 3.7 |
| Viscosity (cps. 25° C.) | 21 | 25 | 22 | 12 | 9 | tion was terminated and the product was immediately adjusted to pH 3.0 using 18% aqueous solution of hydrochloric acid, and diluted with tap water to make a mixture containing 20% solids, having the properties listed in Table 3.

In this reaction the quantities and reaction times of of the 50% aqueous solution of hydroxyethylpolyamidepolyamine, epichlorohydrin, tap water, and additional epichlorohydrin were as listed in Table 2.

TABLE 4
[Results of stability test]

| Test No. | Gelation time (min.) | Mol ratio of ethylene-oxide to dibasic acid |
|---|---|---|
| Reference A | 65 | 0.2 |
| 3-1 | 300 | 0.6 |
| 3-2 | (¹) | 1.0 |
| 3-3 | (¹) | 2.0 |
| 3-4 | (¹) | 3.0 |
| 3-5 | (¹) | 4.0 |
| Reference B | | 5.0 |
| Control | 10 | |

¹ No gelation in 1,440.

TABLE 5
[Results of paper strength test]

| | Breaking length (km.) | |
|---|---|---|
| Test No. | Dry | Wet |
| Reference A | 5.0 | 0.81 |
| 4-1 | 5.1 | 0.89 |
| 4-2 | 5.0 | 0.91 |
| 4-3 | 5.1 | 0.85 |
| 4-4 | 4.6 | 0.24 |
| 4-5 | 4.6 | 0.17 |
| Reference B | | |
| Control | 5.3 | 0.76 |
| Blank test | 4.5 | 0.13 |

The characteristic performances of the water-soluble thermosetting polymers obtained in example 3 of this invention are summarized in Tables 4 and 5.

Notes:

1 In the stability test of Table 4, all the water-soluble thermosetting polymers obtained in example 4 were adjusted to pH 9.0, using a 50% aqueous solution of sodium hydroxide and kept at a temperature of 70±2° C. The time for gelation was measured, taking the moment that the fluidity of a given polymer was lost as the gelation point.

2. In the paper strength test of Table 5, bleached kraft pulp of needle leaved tree of beaten degree 30° SR was added with the polymer of example 4 in the amount of 1% solids of said pulp. The pH is in the range of 6.8–7.2. The paper made therefrom with the basis weight 60±2 g./m² was dried for 10 minutes at 110° C. and thus test paper strips were prepared.

Dry breaking length was measured on a paper strip in an air conditioned room at temperature 20° C., humidity 65 RH.

Wet breaking length was measured after soaking a paper strip in water of 20° C. for 1 minute.

3. The references A and B in Tables 4 and 5 were prepared according to the example 3–1 to demonstrate the effect of the present invention. The tests were carried out on the water soluble thermosetting polymer to which 0.2 mol of ethylene oxide in reference A and 5.0 mols in reference B per mol of dibasic carboxylic acid was reacted.

For reference B, it was planned to react 220 g. of ethyleneoxide (5.0 mols per mol of dibasic acid) with 219 g. polyamide polyamine. However, the reaction was too slow to be utilized in industry when the amount of ethylene oxide exceeded 180 g. and therefore the test was discontinued.

4. The Blank Test in Table 5 was carried out to determine the strength of paper without adding the water soluble thermosetting polymer of the present invention or any other resin to the pulp to be tested.

5. Control in Tables 4 and 5 was a polymer containing 20% solids prepared according to example I of US. Pat. No. 2,926,154 and was tested under the same conditions as those of the present invention.

What is claimed is:

1. A process for producing a water soluble thermosetting polymer, said process comprising the steps of (a) reacting one mol of a dibasic carboxylic acid which has the following formula:

$$HOOC-R-COOH$$

where R represents a saturated aliphatic hydrocarbon having 1–34 carbon atoms, and 1 to 1.8 mols of a polyalkylene-polyamine which has the following formula: 

$$H_2N-(C_nH_{2n}NH)_m-H$$

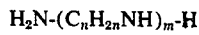
where $n$ is 2 and $m$=2–4, at a temperature of 100°–250° C. under an inert atmosphere or 70°–200° C. under reduced pressure to produce a polyamide polyamine, (b) then reacting said polyamide polyamine with 0.1 to 4 mols of an alkylene oxide selected from the group consisting of ethylene oxide and propylene oxide per mol of said dibasic carboxylic acid at a temperature of 80°–200° C. to form a hydroxyalkyl-polyamidepolyamine and (c) then reacting the resulting product with 0.1–2.5 mols epihalohydrin selected from the group consisting of epichlorohydrin and epibromohydrin at a temperature of 30°–100° C. per mol of active hydrogen in the amino and hydroxy groups of said hydroxyalkyl-polyamidepolyamine to form a water soluble thermosetting polymer.

2. The process of claim 1 in which (a) said dibasic carboxylic acid is adipic acid and said polyalkylene polyamine is diethylene triamine to produce a polyamide polyamine, said reaction being carried out at a temperature of 100°–250° C., and the mol ratio of said diethylene triamine per mol of adipic acid is 1.0–2.0 mols (b) reacting said polyamide polyamine with ethylene oxide to form said hydroxyethyl-polyamidepolyamine, the mol ratio of said ethylene oxide per mol of adipic acid is 0.5–2.0 mols (c) then reacting the resulting product with epichlorohydrin in an aqueous solution, the mol ratio of the said epichlorohydrin per active hydrogen in the amino and hydroxy groups of the hydroxyethyl polyamide polyamine is 0.1–2.0 mols.

3. The process of claim 1, in which the mol ratio of polyalkylene-polyamine to the dibasic carboxylic acid condensed therewith is 1.0–1.8:1, said condensation being carried out at a temperature of 70°–250° C.; the mol ratio of said alkyleneoxide to said dibasic carboxylic acid in said polyamide polyamine is 0.5–4.0:1, said alkylene oxide being reacted at a temperature of 80°–200° C.; and the number of mols of epihalohydrin per active hydrogen in the amino groups and the hydroxy groups of said hydroxy alkyl polyamidepolyamine is 0.1–2.5, said epihalohydrin being reacted at a temperature of 30–100° C.

4. The process as claimed in claim 3, wherein said dibasic carboxylic acid is adipic acid, said polyalkylene-polyamine is selected from the group consisting of diethylenetriamine, triethylenetetramine, and tetraethylenepentamine; said alkyleneoxide is ethyleneoxide, and said epihalohydrin is epichlorohydrine.

5. The process of claim 1, wherein the mol ratio of polyalkylene-polyamine to dibasic carboxylic acid is 1.0–1.2:1; the mol ratio of alkyleneoxide to dibasic carboxylic acid of polyamide polyamine is 0.5–2.0:1; and the number of mols of epihalohydrin per active hydrogen in the amino and hydroxy groups of the hydroxyalkylpolyamidepolyamine is 0.1–2.0.

6. The process of claim 5, in which said dibasic carboxylic acid is selected from the group consisting of glutaric acid, adipic acid, pimelic acid, and mixtures thereof.

7. The polymer made by the process of claim 3.